United States Patent
Mattes

(10) Patent No.: US 6,614,129 B1
(45) Date of Patent: Sep. 2, 2003

(54) CIRCUIT CONFIGURATION CONSISTING OF A DEPLOYMENT ELEMENT FOR A BELT-TENSIONER AND A BELT OPERATION SENSOR

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,168

(22) PCT Filed: Jul. 1, 1999

(86) PCT No.: PCT/DE99/01920

§ 371 (c)(1),
(2), (4) Date: Jul. 7, 2001

(87) PCT Pub. No.: WO00/20261

PCT Pub. Date: Apr. 13, 2000

(30) Foreign Application Priority Data

Oct. 7, 1998 (DE) .......................................... 198 46 113

(51) Int. Cl.⁷ ................................................. B60L 1/00
(52) U.S. Cl. ...................................... 307/10.1; 280/735
(58) Field of Search ......................... 307/10.1; 280/735, 280/801.1, 806

(56) References Cited

U.S. PATENT DOCUMENTS

| | | | | |
|---|---|---|---|---|
| 4,002,219 A | * | 1/1977 | Steinmann | 297/475 |
| 4,614,876 A | * | 9/1986 | Mattes et al. | 280/806 |
| 5,146,104 A | * | 9/1992 | Schumacher et al. | 307/10.1 |
| 5,672,916 A | * | 9/1997 | Mattes et al. | 307/10.1 |
| 5,742,986 A | | 4/1998 | Corrion et al. | |
| 5,879,024 A | | 3/1999 | Estep | |
| 5,906,393 A | * | 5/1999 | Mazur et al. | 280/735 |

FOREIGN PATENT DOCUMENTS

DE          195 05 334          8/1996

\* cited by examiner

Primary Examiner—Brian Sircus
Assistant Examiner—Sharon A. Polk
(74) Attorney, Agent, or Firm—Kenyon & Kenyon

(57) ABSTRACT

A firing element and a belt operating sensor are connected via a common wiring pair to a control unit. The belt operating sensor is either a mechanical switch, which is activated in response to the snapping of a belt tongue into the buckle, or it is composed of an electrically controllable switch, which is controlled by a magnetic-field-sensitive element, which reacts to a magnetic field that is influenced by a belt tongue that is inserted into the buckle. Only via a wiring pair can the control unit both diagnose the firing element as well as determine the operating state of the belt.

8 Claims, 2 Drawing Sheets

CIRCUIT CONFIGURATION CONSISTING OF A DEPLOYMENT ELEMENT FOR A BELT-TENSIONER AND A BELT OPERATION SENSOR

FIELD OF THE INVENTION

The present invention relates to a circuit arrangement, including a firing element for a seat belt tightener, and a belt operation sensor, which can be connected via a common wiring pair to a control unit that evaluates the belt operation sensor and diagnoses the firing element.

BACKGROUND OF THE INVENTION

A circuit arrangement is described in German Published Patent Application No. 195 05 334. This known circuit arrangement has a circuit element that characterizes the working position of the seat belt. In this manner, detecting the working position of the seat belt is made possible by an electronic device. Thus the goal is to detect whether the belt is inserted properly in the buckle, when a person is situated in the seat of the vehicle. If appropriate, when a seat belt has not been inserted properly, a warning signal is emitted. In accordance with this publication, both the belt operating sensor as well as the firing element for the belt tightener are connected to a control device by a common symmetrical wiring pair. As a result of the fact that the belt operating sensor and the firing element are connected to the control unit by their own lines, the risk is reduced that the many lines can result in the coupling of many interference signals. In addition, the complexity of the cable tree and the number of necessary plug-in contacts are reduced as a result. According to German Published Patent Application No. 195 05 334, the firing element for the belt tightener and a buckle switch which is used as a belt operating sensor are connected in parallel to a common wiring pair. Furthermore, a resistor is also connected in series to the buckle switch and a further resistor is connected thereto in parallel.

SUMMARY OF THE INVENTION

The present invention is based on the object of indicating a circuit arrangement of the type mentioned above, which can permit the belt operation to be clearly ascertained and the state of the firing element to be reliably diagnosed.

According to the present invention, the firing element, the belt operating sensor, and a first high-resistance resistor are connected in parallel, the parallel circuit is connected in series to a second low-resistance resistor, and the series circuit composed of the second resistor and the parallel circuit is connected to the two lines. The belt operating sensor is advantageously a mechanically actuatable switch in a buckle, which is opened if a belt tongue is snapped into the buckle, and which is otherwise closed. In this context, the circuit arrangement is a very inexpensive one, having only two ohmic resistors in addition to the firing element and the buckle switch.

According to the present invention, the circuit arrangement is characterized by the fact that a high-resistance resistor is connected in parallel to the firing element, that an electrically controllable switch is connected in series to the parallel circuit composed of the firing element and the resistor and this series circuit is connected to the two lines, and that an element that is sensitive to a magnetic field is present, which generates for the switch a control voltage, which is a function of a magnetic field that is influenced by a belt tongue that is inserted into the buckle. One advantage of this circuit arrangement lies in the fact that it does not have, as a belt operating sensor, a mechanical switch, which is sensitive to contamination, but rather that it is completely wear-free, insensitive to contamination, and connected in a contactless manner, as a result of using an element that is sensitive to a magnetic field.

According to the present invention, it is expedient that the element sensitive to the magnetic field is a Hall element.

According to one refinement of the circuit arrangement, between the two lines, a capacitor is connected in series to the parallel circuit composed of the firing element and the resistor, the capacitor receiving from the control unit a charging current, the capacitor cyclically charging and discharging, and its discharging current flowing through the element that is sensitive to the magnetic field, so that, in this phase, the magnetic-field-sensitive element generates a control voltage that closes the switch. During the charging process that follows the discharge of the capacitor, the switch remains open, due to an insufficient control voltage of the magnetic-field-sensitive element. The control unit can now detect the belt operation, from the pulse duty factor of opening and closing the switch, which, when the belt tongue is snapped into the buckle, is distinguished from the pulse duty factor when the belt is not snapped in. Or the control unit can detect the belt operation from the current on the lines, the current being greater when the belt tongue is snapped in than when it is not, the control unit measuring the current during the open phases of the switch. The diagnosis of the firing element is conducted by the control unit during the closed phases of the switch.

BRIEF DESCRIPTION OF THE DRAWINGS

FIG. 3a depicts a charging and discharging cycle of a capacitor and the switching cycle of an electrical switch, when the belt is not snapped in.

DETAILED DESCRIPTION

Figure 1:
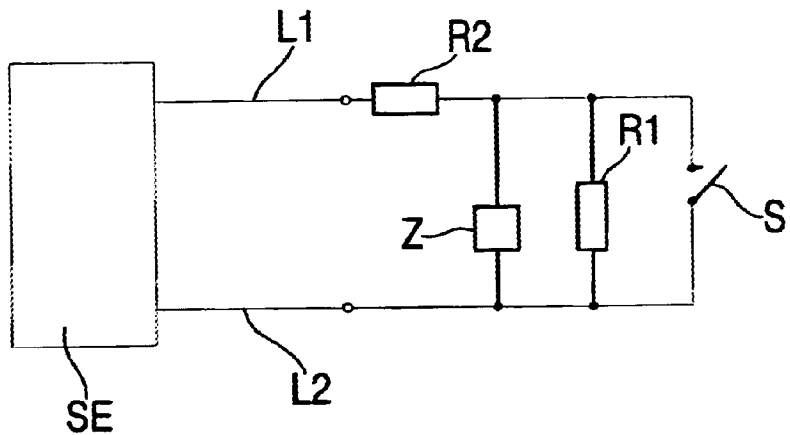
FIG. 1 depicts a first exemplary embodiment.

The circuit arrangement depicted in FIG. 1 has a firing element Z for a belt tightener and a switch S connected in parallel to the belt tightener and functioning as the belt operating sensor. In this context, the switch is a mechanical one, which is integrated in the buckle and which changes its switching position if a belt tongue is snapped into the buckle. If the belt tongue is snapped into the buckle, switch S is opened, and when the belt tongue is not snapped in, switch S is closed. A first high-resistance resistor R1 (e.g., 10 kΩ) is connected in parallel to firing element Z and switch S. A second low-resistance resistor R2 (e.g., 1.5Ω) is connected in series to the parallel circuit composed of firing element Z, high-resistance resistor R1, and switch S. This aforementioned series circuit is connected to a control unit SE via a wiring pair, made up of lines L1 and L2. Control unit SE, in the event of a motor vehicle crash, supplies firing element Z with a firing current, so that the belt tightener is activated. In addition, for safety reasons, a check of the performance reliability of the firing element is carried out by control unit SE. This function check usually is achieved by measuring the resistance of firing element Z. Similarly, control unit SE is supposed to be able to sense the belt operation, i.e., to detect whether switch S is closed (belt not snapped in) or open (belt snapped in).

Using the values indicated above for low-resistance resistor R2 (1.5Ω) and high-resistance resistor R1 (10 kΩ) and for the resistance of firing element Z of approximately 2Ω, control unit SE, when switch S is closed, only measures resistor R2 1.5Ω. If switch S is open, then control unit SE measures the overall resistance, which corresponds roughly to the sum of high resistance resistor R2 and the resistance of firing element Z (1.5Ω+2Ω=3.5Ω). Thus the control unit can clearly distinguish between the two switching states of switch S.

When switch S is closed, control unit SE, on the basis of low-resistance resistor R2 connected in series, can diagnose whether, in the firing circuit, there is a short circuit (measured resistance<1.5Ω) or an interruption (measured resistance>10 kΩ). When switch S is open, the correct resistance of firing element Z can be determined. The measured resistance corresponds to the sum of low-resistance resistor R2 and the resistance of firing element Z (1.5Ω+2Ω=3.5Ω) the resistance 2Ω of firing element Z can be calculated from the measured resistance 3.5Ω. Only when the switch is open, i.e., when the belt is snapped in, can the resistor of firing element Z be diagnosed and also fired. If a firing occurs, then control unit SE will measure a resistance R2+R1 of approximately 10 kΩ. Thus the control unit receives an unamibiguous indication that the belt tightener has been activated.

Figure 2:
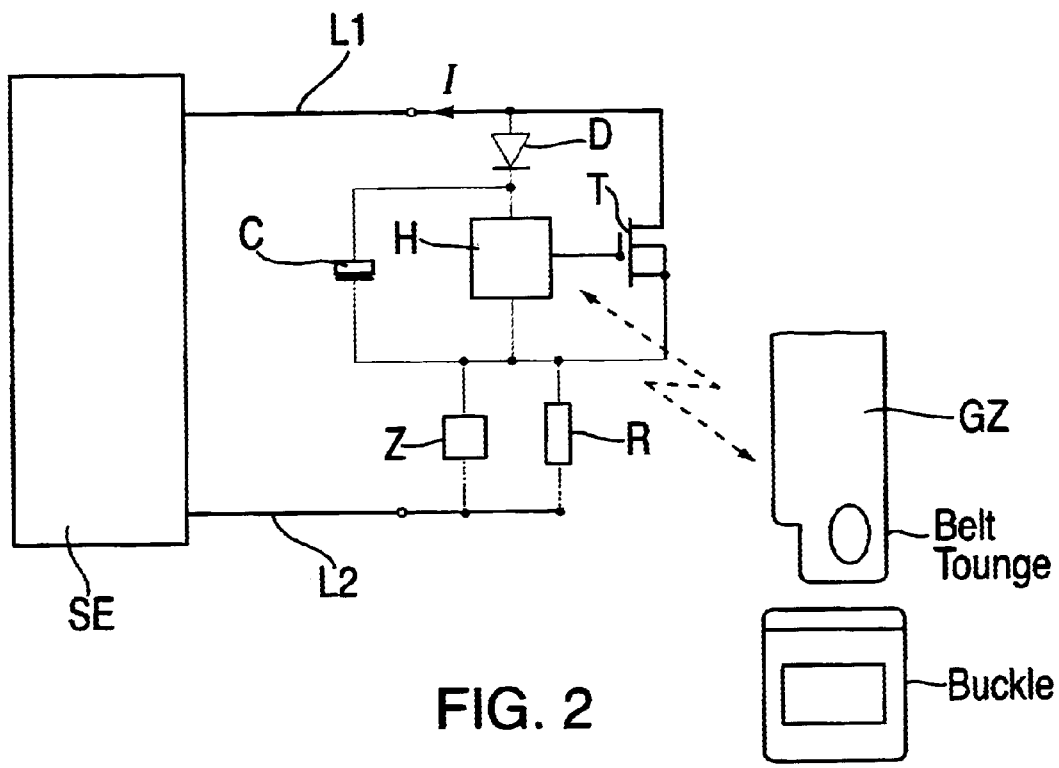
FIG. 2 depicts a second exemplary embodiment of a circuit arrangement, composed of a firing element for a belt tightener, and of a belt operating sensor.

In the exemplary embodiment depicted in FIG. 2, the following circuit arrangements are connected to control unit SE via wiring pair L1, L2. A high-resistance resistor R (e.g., 10 kΩ) is connected in parallel to firing element Z. An electrically controllable switch D, preferably a MOSFET T, is connected in series to this parallel circuit. In addition, a magnetic-field-sensitive element, preferably a Hall element H, and a diode D are connected in series to the parallel circuit composed of firing element Z and high-resistance resistor R. A capacitor C, preferably an electrolyte capacitor (e.g., 47 μF) is connected in parallel to magnetic-field-sensitive element H.

In a familiar manner, Hall element H exploits a deflection of a current, flowing between the terminal poles connected to capacitor C, caused by a magnetic field situated perpendicular thereto. The magnetic field, as is indicated by the dotted-line zigzag arrow, derives from a belt tongue GZ, which, when snapped into the buckle, acts upon Hall element H through its magnetic field. In this context, a charge carrier shift in the direction of the magnetic field leads to the generation of a so-called Hall voltage, which can be tapped off transverse to the direction of current flow. This Hall voltage is used as the control voltage for electrically controllable switch T.

Figure 3A:
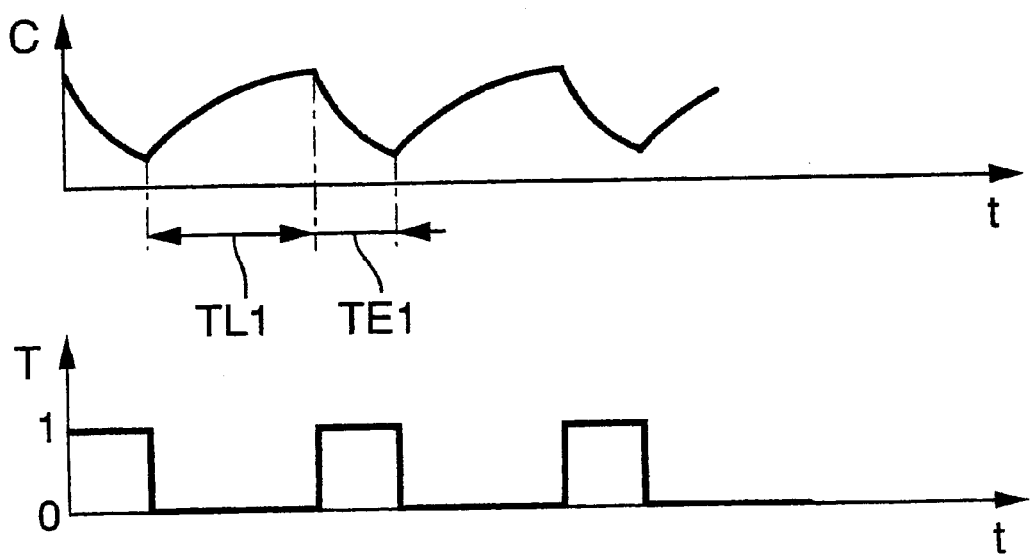
Figure 3B:
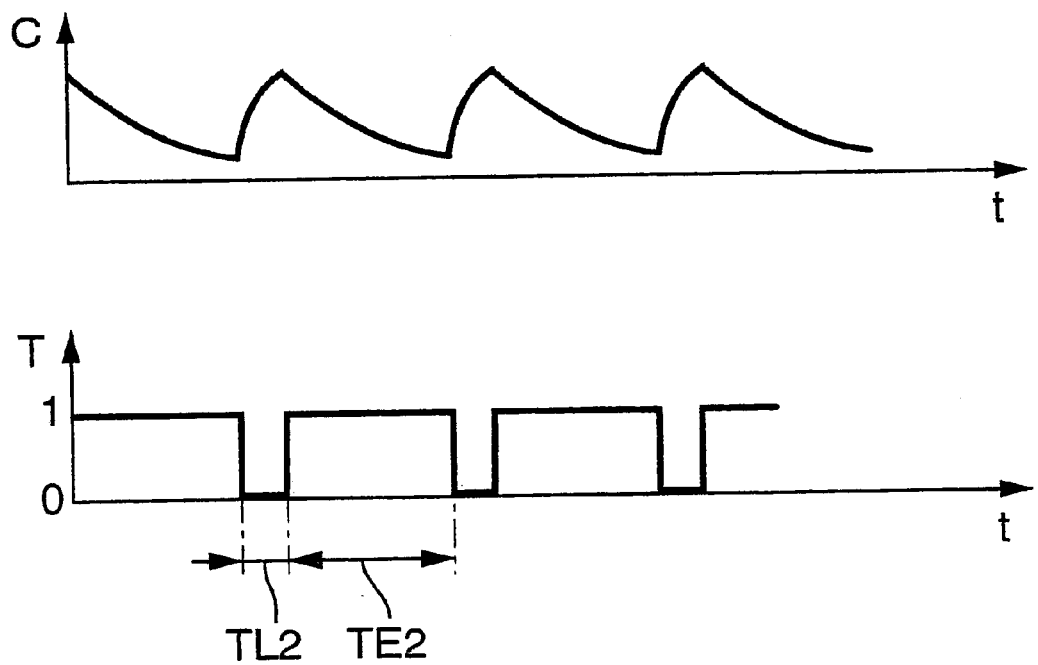
FIG. 3b depicts a charging and discharging cycle of a capacitor and the switching cycle of an electrical switch when the belt is snapped into place.

The mode of functioning of the circuit arrangement is discussed on the basis of FIGS. 3a and 3b. Depicted in FIGS. 3a and 3b are the charge/discharge cycle of capacitor C and the corresponding switching cycle of electrically controllable switch T. FIG. 3a depicts the curves for the case in which belt tongue GZ is not snapped into the buckle, and FIG. 3b depicts the curves when the belt tongue is snapped in.

The assumption is made that electrically controllable switch T is initially open and capacitor C is at least partially discharged. Then diode D is connected so as to be conductive. Capacitor C is then charged during time period TL1 (see FIG. 3a) by a current flowing from control unit SE through diode D and the parallel circuit made up of firing element Z and resistor R. In response to a predetermined charging state of capacitor C, in time period TE1 (see FIG. 3a), a current flows through Hall element H, so that the control voltage generated by Hall element H is sufficient to close switch T. Now diode D is blocked. Capacitor C during time period TE1 discharges via Hall element H until the current flowing through Hall element H is no longer sufficient to generate a control voltage that is large enough that switch T once again closes. After a predetermined discharge of capacitor C, after time period TE1, switch T opens once again. Then diode D is switched in the through direction, and the capacitor is once again charged, etc.

As can be seen from FIG. 3a, switch T is closed during discharging time periods TE1 of capacitor C, and is opened during charging time periods TL1. As is made clear by a comparison of the two FIGS. 3a and 3b, pulse duty factor TL1/TE1, when the belt is not snapped in, is clearly different from pulse duty factor TL2/TE2, when the belt is snapped in. The reason for this is that, due to a magnetic field which is influenced by snapped-in belt tongue GZ, Hall element H receives a lesser current, for which reason capacitor C is discharged more slowly. While switch T is closed, the voltage between the two lines L1 and L2 falls, e.g., to 0.3V, and when switch T is opened, the voltage between the lines L1 and L2 rises, e.g., to 8V. This voltage difference is registered by control unit SE, which can derive the pulse duty factor of switch T therefrom and can unambiguously identify whether the belt is snapped in or not.

In the phases in which switch T is closed, control unit SE can carry out a diagnosis of firing element Z both when the belt is snapped in as well as when it is not. Due to high-resistance resistor R, which is connected in parallel to low-resistance firing element Z, the resistance of firing element Z can be measured very precisely and, on the basis of the measured resistance, it is possible to distinguish very clearly whether a line break or a short-circuit exists in firing element Z.

Control unit SE can also detect the belt working position using a current measurement. Depending on whether the belt is snapped in or not, i.e., belt tongue GZ exerts an influence on the magnetic field in Hall element H, a more or less strong current I flows through Hall element H. When the belt is snapped in, a current flows on lines L1, L2, e.g., of a maximum of 17 mA, and when the belt is not snapped in, a current flows, e.g., of a maximum of 5 mA. This difference of approximately 10 mA is sufficient for control unit SE to detect the belt working position. This current measurement is carried out by control unit SE in opening phases TL1, TL2 of switch T.

What is claimed is:
1. A circuit arrangement, comprising:
   a firing element for a belt tightener;
   a belt operating sensor;
   a control unit for diagnosing the firing element and for evaluating the belt operating sensor;
   a common wiring pair, including a first line and a second line, via which the control unit is connected to the firing element and the belt operating sensor;
   a high-resistance resistor; and
   a low-resistance resistor, wherein:
      the high-resistance resistor, the firing element, and the belt operating sensor are connected in parallel to form a parallel circuit,
      the parallel circuit is connected in series to the low-resistance resistor to form a series circuit, and the series circuit is connected to the first line and the second line.

2. The circuit arrangement according to claim 1, wherein:

the belt operating sensor includes a switch arranged in a buckle, the switch is open when a belt tongue is snapped in the buckle, and the switch is closed when the belt tongue is not snapped in the buckle.

3. A circuit arrangement, comprising:

a firing element for a belt tightener;

a belt operating sensor;

a control unit for diagnosing the firing element and for evaluating the belt operating sensor;

a common wiring pair, including a first line and a second line, via which the control unit is connected to the firing element and the belt operating sensor;

a high-resistance resistor connected in parallel to the firing element to form a parallel circuit;

a controllable switch connected in series to the parallel circuit to form a series circuit, wherein:
   the series circuit is connected to the first line and the second line; and
   a magnetic-field-sensitive element for generating a control voltage for the controllable switch, wherein:
      the control voltage is a function of a magnetic field that is influenced by a belt tongue inserted into a buckle.

4. The circuit arrangement according to claim 3, wherein:

the magnetic-field-sensitive element includes a Hall element.

5. The circuit arrangement according to claim 3, further comprising:

a capacitor arranged between the first line and the second line and connected in series to the parallel circuit, wherein:

the capacitor receives from the control unit a charging current, the capacitor charges and discharges cyclically, and a discharge current of the capacitor flows through the magnetic-field-sensitive element so that, in a phase, the magnetic-field-sensitive element generates the control voltage with a magnitude capable of closing the controllable switch, and that, during a charging operation following a discharge of the capacitor, the controllable switch remains open due to an insufficient magnitude for the control voltage from the magnetic-field-sensitive element.

6. The circuit arrangement according to claim 5, wherein:

the control unit detects a belt operation from a first pulse duty factor of opening and closing the controllable switch, and the first pulse duty factor, when the belt tongue is snapped in the buckle, is distinguished from another pulse duty factor when the belt tongue is not snapped in the buckle.

7. The circuit arrangement according to claim 5, wherein:

the control unit detects a belt operation from a current on the first line and the second line, the current on the first line and the second line is stronger when the belt tongue is snapped in the buckle than when the belt tongue is not snapped in the buckle, and the control unit measures the current on the first line and the second line during an open phase of the controllable switch.

8. The circuit arrangement according to claim 5, wherein:

the control unit performs a diagnosis of the firing element during a closed phase of the controllable switch.

* * * * *